Patented July 29, 1924.

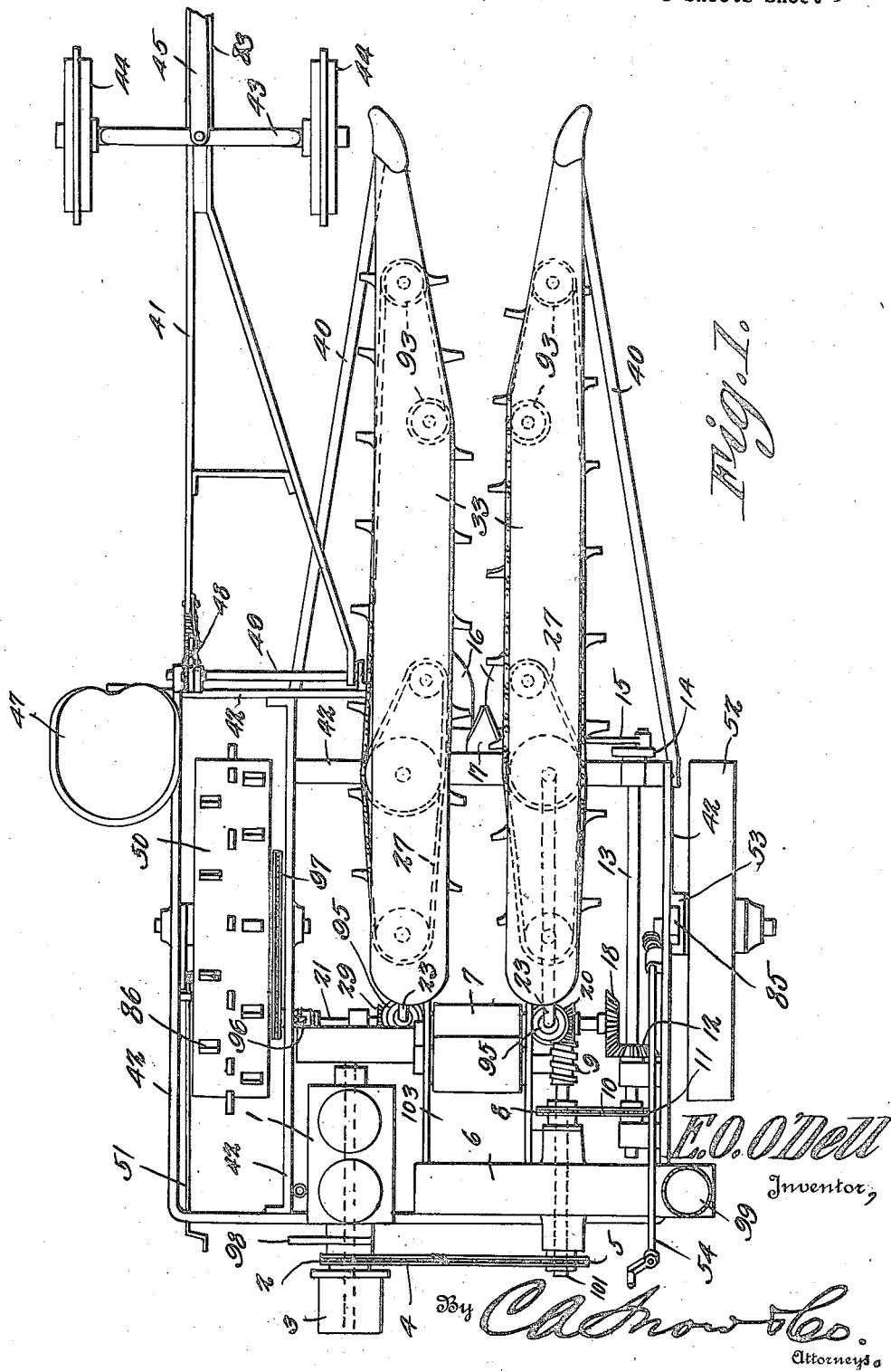

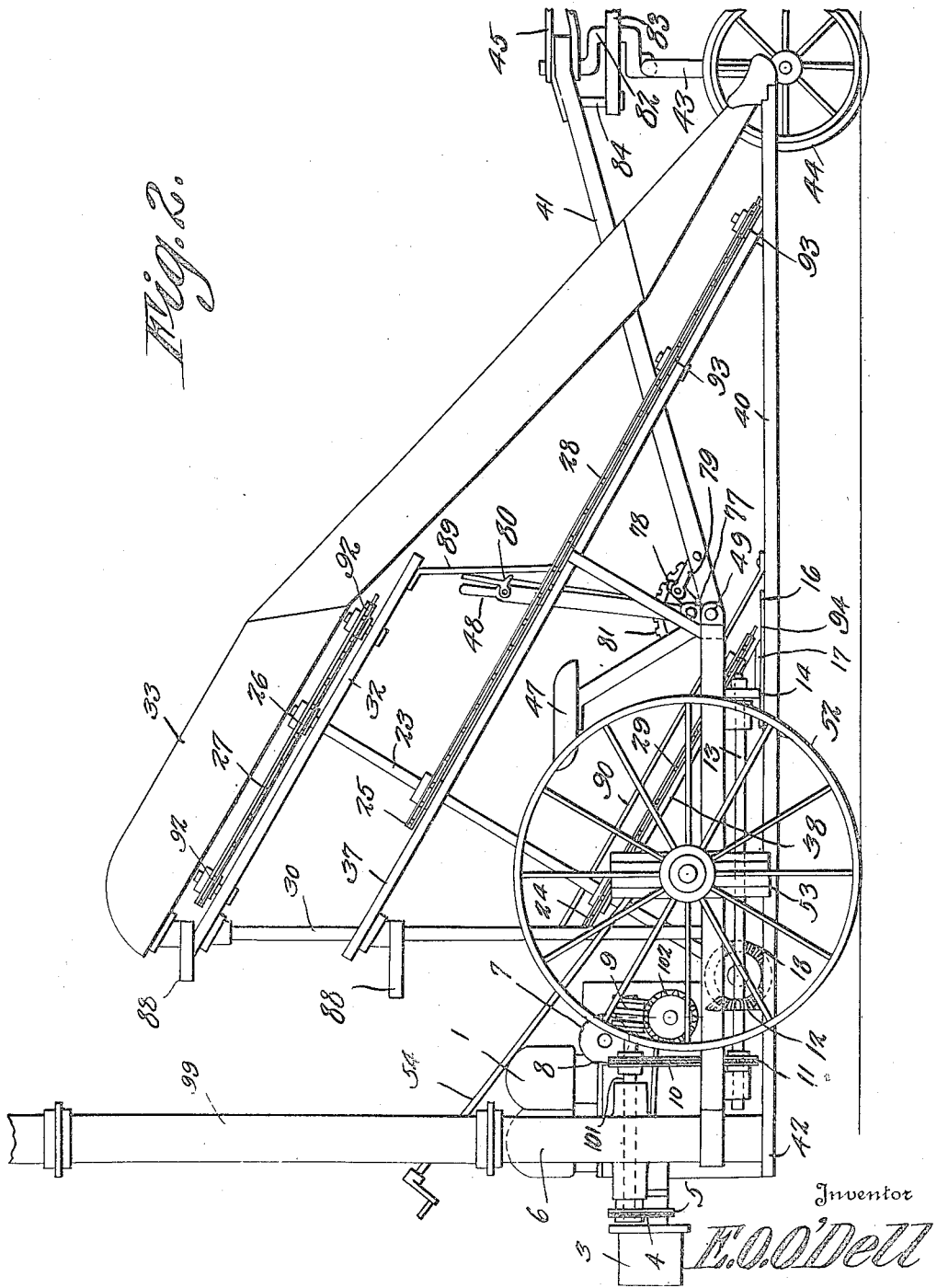

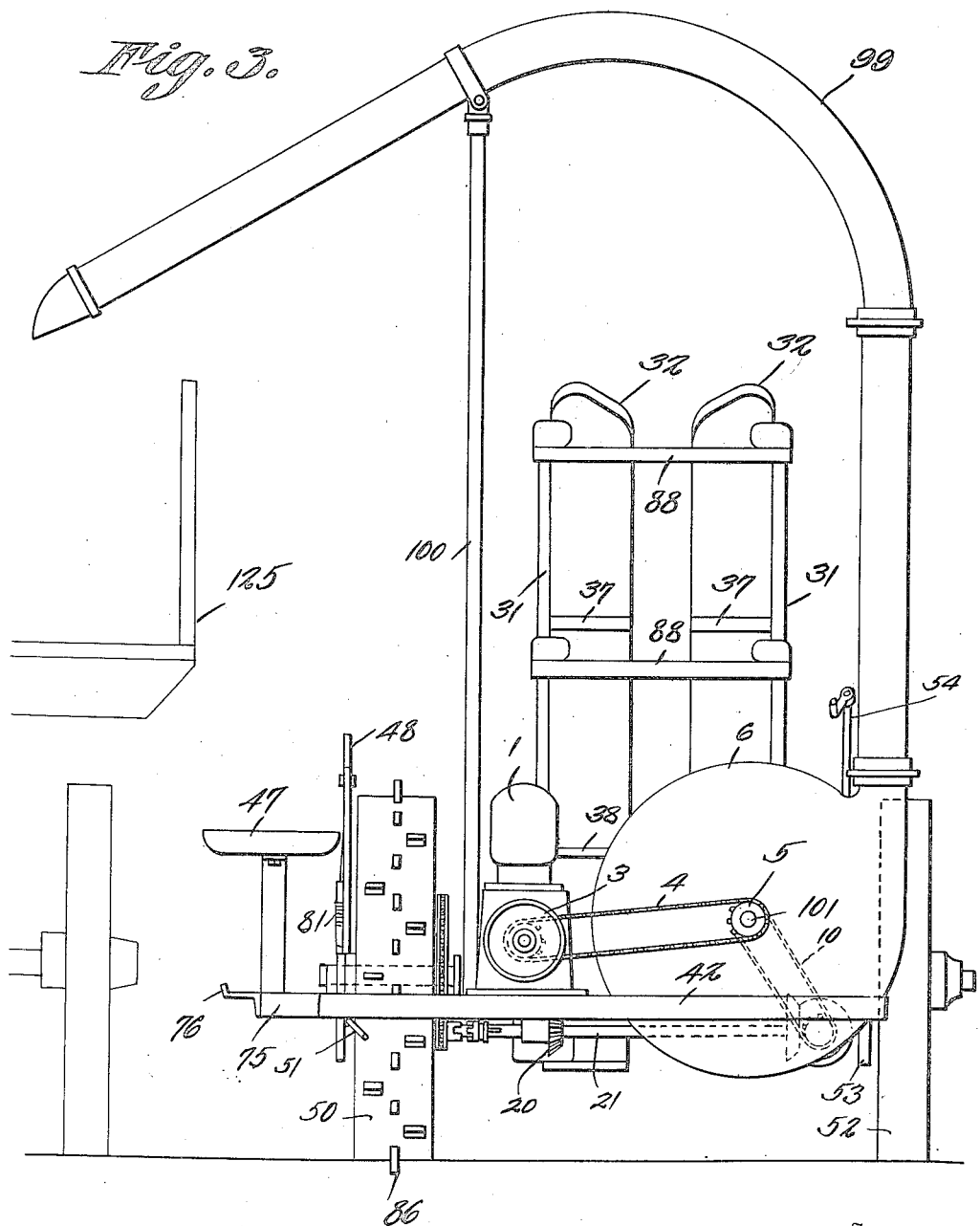

1,502,742

UNITED STATES PATENT OFFICE.

EDWARD OSCAR O'DELL, OF AROYA, COLORADO.

ENSILAGE CUTTER.

Application filed August 3, 1921. Serial No. 489,519.

*To all whom it may concern:*

Be it known that I, EDWARD OSCAR O'DELL, a citizen of the United States, residing at Aroya, in the county of Cheyenne and State of Colorado, have invented a new and useful Ensilage Cutter, of which the following is a specification.

The device forming the subject matter of this application is adapted to be used for cutting standing corn, and for cutting the corn into ensilage, novel means being provided for carrying away the ensilage, after it has been cut, all of the aforesaid operations being carried out upon a machine adapted to move along the corn field.

The invention aims to improve the means for gathering the corn into the field of the cutting mechanism, to improve the cutting mechanism, to provide novel means for conveying the corn to the ensilage cutter, and for cutting the ensilage and carrying it away.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 is a side elevation; and Figure 3 is an end elevation wherein parts have been omitted.

The device forming the subject matter of this application includes a main frame 42, carrying an offset bracket 75 (Figure 3), the bracket supporting a seat 47 and a foot rest 76. Rails 40 (Figure 1) project forwardly from the frame 42, and form part thereof. The frame 42 carries a support 49, in the form of a rod, on which a forwardly extended auxiliary frame 41 is mounted to swing for vertical adjustment. A lever 48 (Figure 2) is fulcrumed at 77 on the frame 42 and includes a forwardly extended arm 78 connected by a link 79 with the auxiliary frame 41. The lever 48 carries a latch mechanism 80 adapted to coact with a segment 81 mounted on the main frame 42. At 43 there appears a truck frame, carrying ground wheels 44. The truck frame 43 is provided at its upper end with a crank 82, journaled in the forward end of the auxiliary frame 41. The crank 82 is engaged by a draft tongue 83, the rear end of which is pivoted at 84 to the auxiliary frame 41, the construction being such that when the tongue 83 is swung laterally, a steering of the machine will be effected, through the instrumentality of the crank 82. The upper end of the crank 82 carries straps 45 adapted to support a whiffle tree, (not shown) should it be desired to move the machine by the efforts of draft animals. The showing as to the truck frame or tongue truck is of a more or less conventional nature, this part of the machine being one upon which no emphasis is laid. The parts of the tongue truck are not assembled with micrometric exactness, and there is sufficient play between the parts, for instance, between the straps 45 and the crank 82 so that the frame-adjusting mechanism, including the lever 48 and attendant parts, may operate in the common and well known manner.

The numeral 52 marks a ground wheel, carried by a slide 53 mounted for vertical reciprocation in a guide 85 carried by the frame 42, any suitable means 54 being provided for raising and lowering the slide 53. A ground wheel 50 is provided and is supplied with traction spurs 86, the ground wheel being carried by vertically adjustable bearings 87, mounted on the frame 42 and operated by any appropriate or common means, indicated at 51.

Standards 30 are erected on the frame 42 and are connected by tie bars 88, the standards being sustained from the frame 42 by braces 90. Upper guides 33 are mounted at their rear ends on the upper ends of the standards 30, the forward ends of the guides being connected to the rails 40. Disposed below the guides 33 are guides 32, mounted at their rear ends on the standards 30 and sustained at their forward ends by brackets 89, carried by guides 37, located below the guides 32, the rear ends of the guides 37 being mounted on the standards 30 and the forward ends of the guides 37 being mounted on the rails 40. Guides 38 are disposed below the guides 37 and extend between the standards 30 and the rails 40, all of the aforesaid guides being downwardly and forwardly inclined.

The guides 32 are traversed by gathering chains 27 engaged around idle sprockets 92 journaled on the guides 32. Shafts 23 are mounted to rotate in the guides 32, 37 and 38, the shafts 23 being provided with sprocket wheels 26 which engage the gathering chains 27 and operate the same. The shafts 23 carry sprocket wheels 25 driving sprocket chains 28 traversing the guides 37 and engaged around idle sprockets 97 on the said guides. The shafts 23 carry sprocket wheel 24 driving gathering chains 29 cooperating with the guides 38, the chains 29 being engaged around idlers 94 mounted on the guides 38 at the forward ends thereof.

On the lower rear ends of the shafts 23 there are beveled pinions 95 meshing with beveled pinions 19 on a horizontal countershaft 21 journaled in the frame 42. A clutch 96 is interposed in the shaft 21. The shaft 21 is connected operatively with the ground wheel 50, through the instrumentality of a sprocket chain 97.

An engine 1 is mounted on the frame 42, the shaft of the engine carrying a pulley 3 and a sprocket wheel 2 which are loose on the said shaft, the pulley and the sprocket wheel being adapted to be connected to the shaft of the engine, operatively by means of a clutch 98. An ensilage cutter 6 is carried by the frame 42 and has an upwardly and laterally extending discharge pipe 99 supported by a prop 100. A sprocket chain 4 is engaged around the sprocket wheel 2 and cooperates with a sprocket wheel 5 on the shaft 101 of the ensilage cutter 6. The shaft 101 of the ensilage cutter carries a worm 9, meshing with a worm wheel 102 operatively connected with one of a pair of cooperating feed rollers 7 journaled upon and cooperating with a chute 103 which discharges into the ensilage cutter 6. The shaft 101 of the ensilage cutter 6 carries a sprocket wheel 8 coacting with a sprocket chain 10 engaged around a sprocket wheel 11 on a shaft 13 journaled on the frame 42. A beveled pinion 12, mounted on the shaft 13, engages a beveled pinion 18 carried by the shaft 21. On the forward end of the shaft 13 there is a crank disk 14, connected to a pitman 15 which in its turn, constitutes means for actuating a cutter 17 mounted for reciprocation on the frame, the frame carrying fixed knives of guides 16.

When the engine 1 is operated, motion is transmitted by the sprocket chain 4 to the shaft 101 of the ensilage cutter 6. From the shaft 101 of the ensilage cutter, the sprocket chain 10 imparts motion to the shaft 13, the shaft 13 operating the cutter 17 by way of the crank disk 14 on the pitman 15. One of the feed rollers 7 is driven from the shaft 101 of the ensilage cutter, by the worm 9 and the worm wheel 102. The beveled pinions 12 and 18 impart motion to the shaft 21, from the shaft 13. If the clutch 96 is properly manipulated, the ground wheel 50 will be rotated from the shaft 21, by the sprocket chain 97. When the shaft 21 is rotated, the beveled pinions 95 and 29 drive the shafts 23, the gathering chains 27, 28 and 29 deriving their motion from the shafts 23.

The corn is received between the guides 33, the upper end of the corn being carried rearwardly by the chains 27, the intermediate portion of the corn being carried rearwardly by the chains 28, and the butts of the corn being carried rearwardly by the chains 29. The corn passes between the fixed guides or knives 16 and is operated on by the reciprocating cutter 17, the corn being severed. The gathering chains deliver the corn to the rollers 7 which pass the corn rearwardly, through the chute 103, to the ensilage cutter 6. The corn, having been cut up in the ensilage cutter 6, is forced upwardly through the pipe 99 and may be discharged into a vehicle 125, driven alongside the machine. By manipulating the lever 48, the forward portion of the main frame 42 may be raised and lowered, thereby adjusting the distance between the knives 17 and the ground.

Having thus described the invention, what is claimed is:—

1. In a device of the class described, a frame; guides carried by the frame; first shafts journaled in the guides; gathering chains traversing the guides and driven by the first shafts; a horizontal shaft journaled on the frame and disposed transversely thereof; beveled pinions connecting the horizontal shaft with the first shafts; a ground wheel journaled on the frame; means for connecting the ground wheel with the horizontal shaft; a third shaft journaled on the frame and disposed parallel to the line of advance; beveled pinions connecting the third shaft with the horizontal shaft; a cutter cooperating with the guides; means for connecting the cutter operatively with the main shaft; an ensilage cutter on the frame and located to the rear of the guides, the ensilage cutter including a shaft; an engine on the frame; means for connecting the engine with the shaft of the ensilage cutter; means for connecting the shaft of the ensilage cutter with the third shaft; feed rolls journaled on the frame and located between the gathering chains and the ensilage cutter; and means for driving one of the rolls from the shaft of the ensilage cutter.

2. In a device of the class described, a frame; an ensilage cutter on the rear end of the frame and including a shaft; an engine on the rear end of the frame; means for connecting the engine with the shaft of the ensilage cutter; a horizontal shaft disposed transversely of the frame and journaled thereon; a ground wheel carried by the frame; means for connecting the ground wheel with the horizontal shaft; a third shaft journaled on the frame and disposed parallel to the line of advance; means for connecting the third shaft with the engine shaft and with the horizontal shaft; guides carried by the frame; gathering chains traversing the guides; shafts journaled in the guides and operating the gathering chains; means for imparting rotation to the last specified shafts from the horizontal shaft; a cutter operating beneath the guides and driven by the third shaft; feed rolls journaled on the frame and disposed between the ensilage cutter and the guides; and means for driving one of the rolls from the shaft of the ensilage cutter.

3. In a device of the class described, a frame; guides carried by the frame; first shafts journaled in the guides; gathering chains traversing the guides and driven by the first shafts; a horizontal shaft journaled on the frame and extended transversely of the frame; means for connecting the horizontal shaft with the first shafts; a ground wheel journaled on the frame; means for connecting the ground wheel with the horizontal shaft; a third shaft journaled on the frame and disposed parallel to the line of advance; means for connecting the third shaft with the horizontal shaft; a cutter operating beneath the guides; means for connecting the cutter with the third shaft; an ensilage cutter mounted on the frame and disposed at the rear end thereof, the ensilage cutter including a shaft; means for connecting the shaft of the ensilage cutter with the third shaft; an engine on the frame; means for driving the shaft of the ensilage cutter from the engine; and means for carrying the material from the gathering chains to the ensilage cutter.

4. In a device of the class described, a frame; an ensilage cutter on the frame and including a shaft extended parallel to the line of advance; an engine on the frame; means for connecting the engine with the shaft of the ensilage cutter; a chute discharging into the ensilage cutter; rollers cooperating with the chute; a worm drive between one roller and the shaft of the ensilage cutter; a horizontal shaft disposed transversely of the frame; a ground wheel carried by the frame; means for connecting the ground wheel with the horizontal shaft; gathering means on the frame and discharging toward the rollers; mechanism for operating the gathering means from the horizontal shaft; a cutting means operating beneath the gathering means; and mechanism for connecting the cutting means with the shaft of the ensilage cutter, said means comprising a part coacting with the horizontal shaft to impart rotation thereto.

In testimony that I claim the foregoing as my own, I have hereto affixed my signature in the presence of two witnesses.

EDWARD OSCAR O'DELL.

Witnesses:
M. R. GLERES,
W. D. OWEN.